Y. W. SHORT.
Clod-Crusher.
No. 1,480.
Patented Jan. 28, 1840.
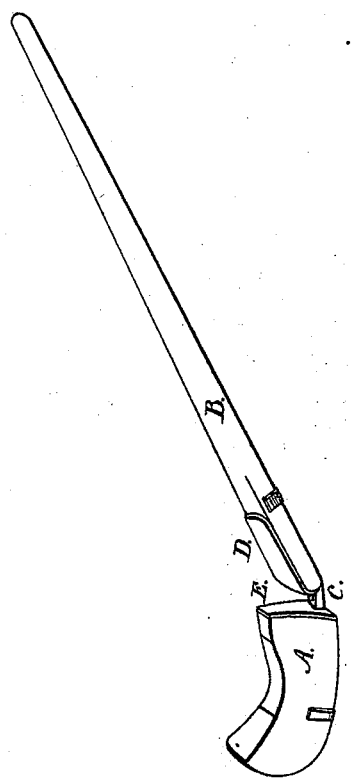

UNITED STATES PATENT OFFICE.

YOUNG W. SHORT, OF OGLETHORPE COUNTY, GEORGIA.

MACHINE FOR EXTRACTING GRUBS, &c., FROM LAND.

Specification forming part of Letters Patent No. 1,480, dated January 28, 1840.

*To all whom it may concern:*

Be it known that I, YOUNG WM. SHORT, of the county of Oglethorpe and State of Georgia, have invented an Instrument for Removing Grubs and Bushes from Land, of which the following is a full and complete description, the drawing referred to forming part of the specification.

My invention consists of two parts: first, of a lever or handle, B, about six feet in length and made round like a hoe-helve for most of its length, but square and rather flattened at one end; secondly, of a piece of wood, A, about twelve inches in length, which is connected to the square end of the lever by means of a hinge, C.

The lever B, I construct of any suitable timber, and make it about two inches in diameter at one end, from which it gradually increases in diameter to the opposite end, which, as already mentioned, is made square and somewhat flattened, the lever being greater in width than thickness at this part.

On one of these flattened sides I fasten, near the end of the lever, a plate, D, of steel or iron which is indented like the claws of pinchers, so as to hold the grub between it and a similar surface on the other part of my invention, which I am about to describe. This consists of the piece A, which, as already stated, is about twelve inches in length and curved on its upper and under surfaces from one end to the other in the form of a sleigh-runner or the ordinary skate-iron, the two surfaces meeting at one end, so as to form a point, and so beveled on its sides that the upper surface is about one-fourth the thickness of the lower surface and somewhat concave. The form, however, is not of any material consequence, as it may be varied without affecting the principle of my invention. The heel end of this piece, which is made level, I cover with a plate of steel or iron, E, indented like the claws of pinchers, so as to enable it to retain the grubs which are introduced between it and the indented plate D on the lever B, already described, to effect which the square end of the lever is connected by a hinge, C, with the heel or large end of the piece A, the hinge being so constructed as to bring the two indented or roughened surfaces together.

In the operation of the instrument the grub or bush is taken between the indented surfaces, which retain it like a vice, while the whole machine acts as a lever to wrest it from its bed. The instrument may be made of any proportions, and the plates, instead of being indented, may be merely roughened, like a rasp; or, if it should be found best, the plates may be dispensed with and the grub retained between the surface of the lever B and piece A.

What I claim as my invention, &c., is—

The combination of the pieces A and B, constructed and operating in the manner and for the purpose herein specified.

YOUNG WM. SHORT.

Witnesses:
 T. VERNON,
 WM. BAVINETT.